(12) United States Patent
Chang

(10) Patent No.: US 9,667,104 B2
(45) Date of Patent: May 30, 2017

(54) THREE-PHASE MOTOR STRUCTURE

(75) Inventor: Nai-Hsin Chang, Kaohsiung (TW)

(73) Assignee: Herng Shan Electronics Co., Ltd., Kaohsiung (TW)

( * ) Notice: Subject to any disclaimer, the term of this patent is extended or adjusted under 35 U.S.C. 154(b) by 222 days.

(21) Appl. No.: 13/409,462

(22) Filed: Mar. 1, 2012

(65) Prior Publication Data

US 2013/0106214 A1 May 2, 2013

(30) Foreign Application Priority Data

Oct. 28, 2011 (TW) .............................. 100220282 U

(51) Int. Cl.
| | |
|---|---|
| H02K 11/00 | (2016.01) |
| H02K 1/26 | (2006.01) |
| H02K 1/12 | (2006.01) |
| H02K 15/04 | (2006.01) |
| H02K 1/14 | (2006.01) |
| H02K 3/52 | (2006.01) |

(52) U.S. Cl.
CPC ............ *H02K 1/148* (2013.01); *H02K 3/522* (2013.01); *H02K 2203/03* (2013.01); *Y10T 29/49009* (2015.01)

(58) Field of Classification Search
CPC . H02K 1/28; H02K 1/18; H02K 11/00; H02K 15/02; H02K 15/04
USPC .... 310/216.051, 216.079, 216.086, 216.088, 310/216.091, 216.094, 216.098, 254.1, 310/433, 71; 29/596
See application file for complete search history.

(56) References Cited

U.S. PATENT DOCUMENTS

| | | | | |
|---|---|---|---|---|
| 6,880,229 | B2 * | 4/2005 | Zepp | ...................... H02K 1/148 29/596 |
| 7,064,470 | B2 | 6/2006 | Yokoyama et al. | |
| 7,646,127 | B2 | 1/2010 | Fujii et al. | |
| 2002/0079780 | A1 * | 6/2002 | Muszynski | ............ H02K 1/148 310/216.061 |
| 2004/0021393 | A1 * | 2/2004 | Suzuki et al. | ................ 310/218 |
| 2006/0192457 | A1 * | 8/2006 | Nakayama | ............. H02K 17/16 310/211 |
| 2007/0024149 | A1 * | 2/2007 | Nagata et al. | ................ 310/217 |
| 2007/0290567 | A1 * | 12/2007 | Adaniya | ............... H02K 1/148 310/216.004 |
| 2008/0143210 | A1 | 6/2008 | Wang et al. | |
| 2009/0127964 | A1 * | 5/2009 | Yumoto et al. | ............... 310/195 |
| 2009/0315428 | A1 | 12/2009 | Chou et al. | |
| 2010/0019592 | A1 * | 1/2010 | Altindis | ......................... 310/71 |
| 2010/0141059 | A1 * | 6/2010 | Nishimura | ..................... 310/44 |
| 2012/0119606 | A1 | 5/2012 | Chen et al. | |

FOREIGN PATENT DOCUMENTS

| | | | |
|---|---|---|---|
| JP | 2011244675 | A * | 12/2011 |
| TW | M335869 | | 7/2008 |

* cited by examiner

*Primary Examiner* — Jose Gonzalez Quinones
(74) *Attorney, Agent, or Firm* — Alan D. Kamrath; Kamrath IP Lawfirm, P.A.

(57) ABSTRACT

A three-phase motor structure includes a sectional stator, a winding set, a circuit board and an inner rotor. The sectional stator includes a detachable pole set which has a plurality of pole teeth. Before being assembled, the winding set is wound on the pole pins of the detachable pole set. The circuit board is mounted on the sectional stator and electrically connects with the winding set. The inner rotor extends through the sectional stator when assembled.

4 Claims, 4 Drawing Sheets

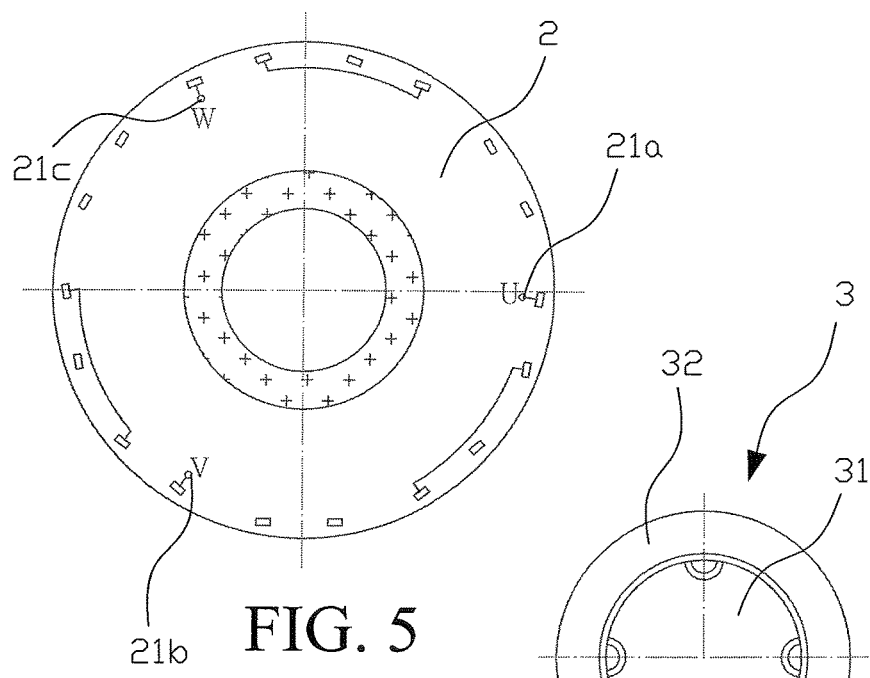
FIG. 5
FIG. 6
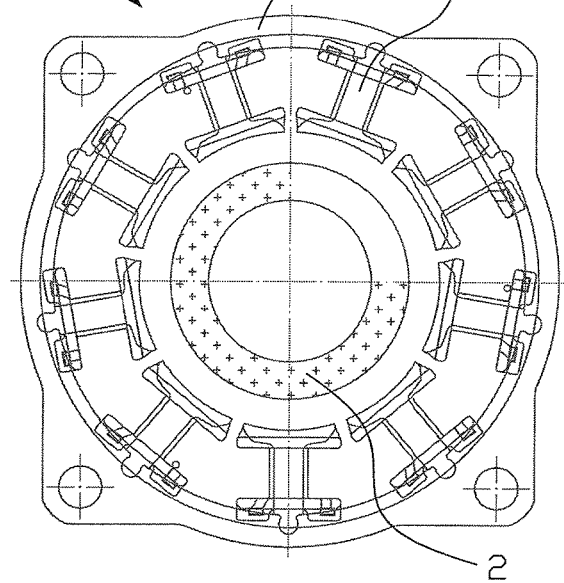
FIG. 7

THREE-PHASE MOTOR STRUCTURE

BACKGROUND OF THE INVENTION

1. Field of the Invention

The present invention relates to a three-phase motor structure and a manufacturing method thereof. More particularly, the present invention relates to a brushless three-phase motor structure with a sectional stator.

2. Description of the Related Art

U.S. Patent Application Publication No. 20080143210, entitled "Three-phase motor stator," discloses a three-phase motor stator including at least one plate board. The plate board has a circular hole. A plurality of pole-teeth protrudes from the rim of the circular hole, and the pole-teeth are symmetric. In fact, the three-phase motor stator is an inner stator core suitable for driving an outer rotor ring.

Another U.S. Patent Application Publication No. 20090315428, entitled "Lamination of stator of three-phase motor for increasing winding space," discloses a stator of a three-phase motor having a core ring and multiple winding frames. However, the three-phase motor stator is an inner stator core suitable for driving an outer rotor ring.

Another Taiwanese Patent Publication No. M335869, entitled "Three-phase motor stator with an increased winding space," discloses a three-phase motor stator. However, the three-phase motor stator is an inner stator core which is suitable for driving an outer rotor ring.

Another U.S. Pat. No. 7,064,470, entitled "Three-phase motor," discloses a three-phase motor having an outer ring-shaped stator and an inner rotor core. Inner poles are integrated and provided on an inner ring edge of the outer ring-shaped stator for wire winding. However, the integrated inner poles will reduce the wire winding speed.

Another U.S. Pat. No. 7,646,127, entitled "Winding for three-phase motor," also discloses a three-phase motor having an outer ring-shaped stator and an inner rotor core. Inner poles are integrated and provided on an inner ring edge of the outer ring-shaped stator for wire winding. However, the integrated inner poles will reduce the wire winding speed.

The above-mentioned patents are incorporated herein by reference for purposes including, but not limited to, indicating the background of the present invention and illustrating the state of the art.

As is described in greater detail below, the present invention provides an improved three-phase motor structure. An outer stator ring frame and a series of pole-tooth units are prepared to be assembled to form a sectional stator for speeding a wire winding operation. Before being assembled, windings are formed on pole teeth by a wire winding machine for speeding a wire winding process in such a way to mitigate and overcome the above problem.

SUMMARY OF THE INVENTION

The primary objective of this invention is to provide a three-phase motor structure. An outer stator ring frame and a series of pole-tooth units are assembled to form a sectional stator after windings are completely formed on corresponding pole teeth in a wire winding process. Accordingly, the structure of the three-phase motor structure is successful in speeding a wire winding operation.

The three-phase motor structure in accordance with an aspect of the present invention includes:
an outer stator ring frame;
a plurality of pole tooth units having pole teeth;
a plurality of windings formed on the corresponding pole teeth prior to being assembled; and
an inner rotor core;
with the outer stator ring frame and the pole-tooth units assembled to form a sectional stator in which to extend the inner rotor core.

The three-phase motor structure in accordance with another aspect of the present invention includes:
a sectional stator including detachable pole set having a plurality of pole teeth;
a plurality of windings wound on the corresponding pole teeth before assembling the sectional stator;
a printed circuit board assembled on the sectional stator and electrically connected with the windings; and
an inner rotor core arranged to extend into the sectional stator.

In a separate aspect of the present invention, the outer stator ring frame includes at least one first engaging portion, and the pole tooth units include at least one second engaging portion to engage with the first engaging portion.

In a further separate aspect of the present invention, the outer stator ring frame includes an inner flange on which to provide the first engaging portion.

In yet a further separate aspect of the present invention, the pole tooth unit includes an outer flange on which to provide the second engaging portion.

In yet a further separate aspect of the present invention, the first engaging portion is selected from a recession or a protrusion, while the second engaging portion is selected from a protrusion or a recession.

In yet a further separate aspect of the present invention, the windings include a plurality of wire connection ends, and the printed circuit board includes a plurality of contact points provided with assembling marks to correspondingly connect with the wire connection ends.

In yet a further separate aspect of the present invention, the contact points include a first phase contact point with the assembling mark "U", a second phase contact point with the assembling mark "V", and a third phase contact point with the assembling mark "W".

In yet a further separate aspect of the present invention, the winding includes an isolation device provided between the winding and the pole tooth.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5 and 6 are schematic views of a printed circuit board and an inner rotor core applied in the present invention.

FIG. 7 is a schematic view of a sectional stator of the present invention.

DETAILED DESCRIPTION OF THE INVENTION

It is noted that a three-phase motor structure in accordance with the preferred embodiment of the present invention is suitable for various brushless three-phase motor structure, for example: 9 pole teeth or 12 pole teeth, which are not limitative of the present invention. The three-phase motor structure in accordance with the present invention is suitable for applying in various electrical devices, for example, a fan motor, which are not limitative of the present invention.

Figure 1:
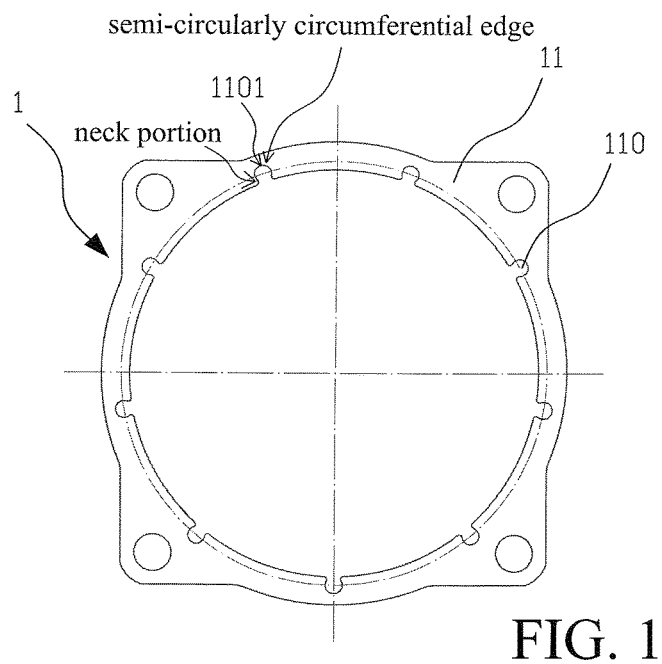
FIGS. 1 and 2 are schematic views of an outer stator ring frame and pole tooth units applied in a three-phase motor structure in accordance with a preferred embodiment of the present invention.
Figure 2:
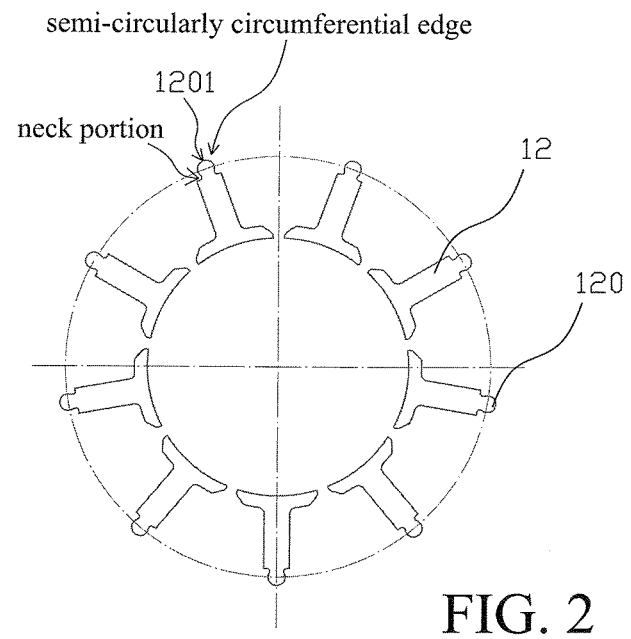

Referring to FIGS. 1 and 2, the three-phase motor structure includes a sectional stator 1 having an outer stator ring frame 11 and a series of pole tooth units 12. The outer stator ring frame 11 and the pole tooth units 12 are made of magnetically conductive materials or other similar materials, for example: silicon steel plates. The outer stator ring frame 11 has an inner circumferential flange (dotted line in FIG. 1) surrounding a longitudinal axis to form an axial hole. The inner flange of the outer stator ring frame 11 corresponds to the pole tooth units 12, so that the outer stator ring frame 11 and the pole tooth units 12 are assembled to form the sectional stator 1.

Figure 3:
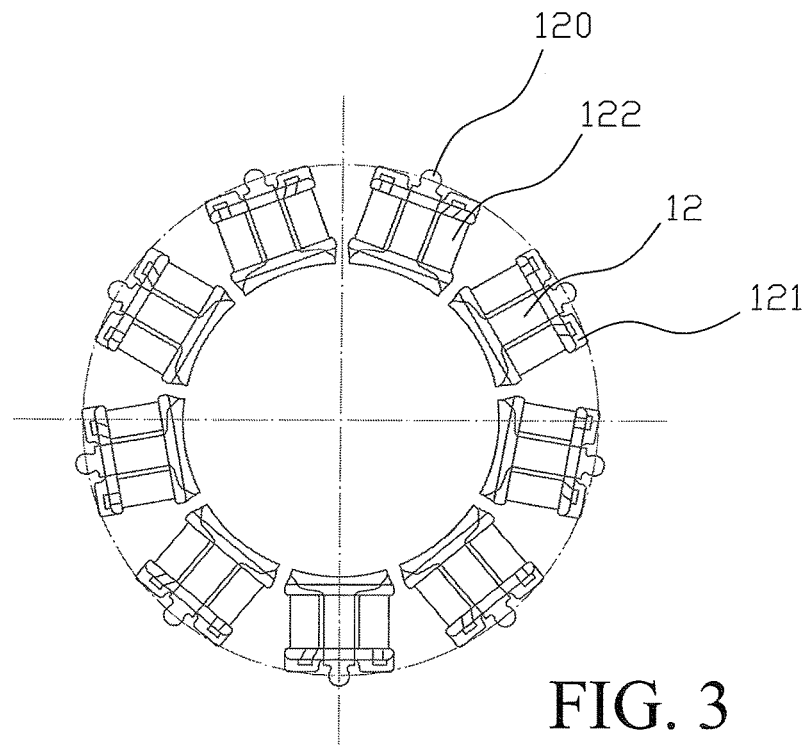
FIG. 3 is a schematic view of the pole tooth units combined with isolation jackets applied in the present invention.
Figure 4:
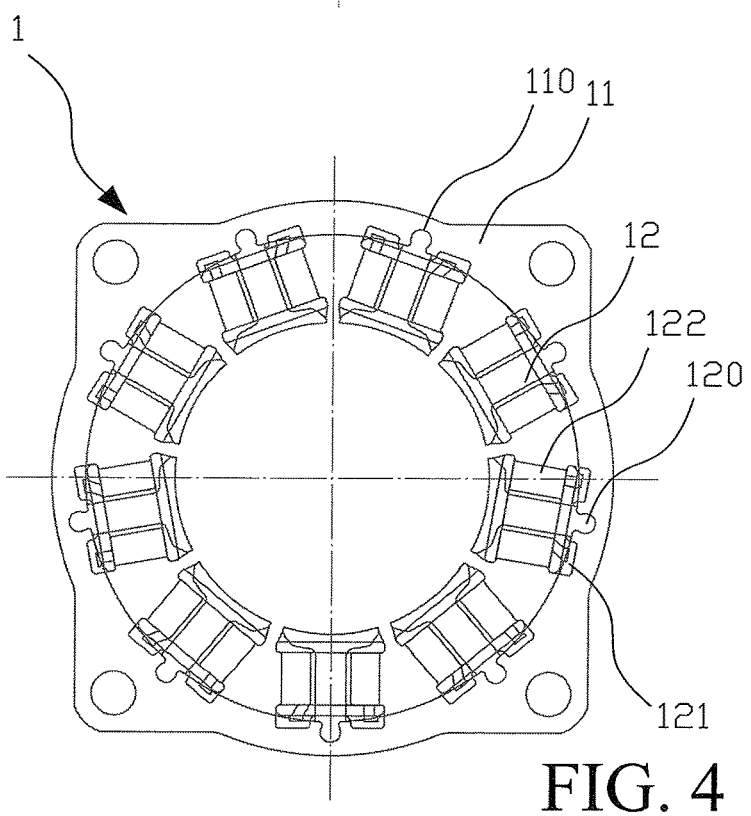
FIG. 4 is a schematic view of the pole tooth units engaged with the outer stator ring frame applied in the present invention.

Turning now to FIGS. 2 and 3, the pole tooth units 12 are detachable from the outer stator ring frame 11 for disassembly and include a plurality of pole teeth, for example: 9 pole teeth. When assembled, the pole tooth units 12 are deployed along the inner flange of the outer stator ring frame 11 and are equi-spaced apart. Each of the pole tooth units 12 has an outer flange (dotted line in FIG. 2) located on the pole tooth. The outer flange of the pole tooth unit 12 corresponds to the inner flange of the outer stator ring frame 11. Furthermore, each pole tooth of the pole tooth units 12 has an inner pole face with respect to the longitudinal axis.

With continued reference to FIGS. 2 and 3, the pole tooth units 12 include an isolation device 121 and a winding set 122, and the isolation device 121 is provided between the winding set 122 and the pole teeth. In addition, the isolation device 121 includes a plurality of isolation jackets, while the winding set 122 includes a plurality of wire windings and a plurality of wire connection ends, as best shown in FIG. 3. Thus, each pole tooth is provided with at least one isolation jacket and at least one wire winding. Prior to assembling the sectional stator 1, the winding set 122 is wound on each pole teeth of the pole tooth units 12 by a wire winding machine, and, subsequently, the isolation device 121 is further formed on the pole tooth units 12 to speed the wire winding process (the entire assembling process).

Turning now to FIGS. 1 through 4, in assembling, each outer flange of the pole tooth units 12 is correspondingly engaged with the inner flange of the outer stator ring frame 11 by magnetic conductive materials (paste), for example. The outer stator ring frame 11 includes at least one first engaging portion 110, including a first neck portion, a first circumferential topmost portion and a first semi-circularly circumferential edge extended from a first end point of the first neck portion to a second end point thereof and passing through the first circumferential topmost portion 1101, while the pole tooth units 12 include at least one second engaging portion 120, including a second neck portion, a second circumferential topmost portion and a second semi-circularly circumferential edge extended from a first end point of the second neck portion to a second end point thereof and passing through the second circumferential topmost portion 1201, to engage with the first engaging portion 110 for easy and removably assembling. Preferably, the first neck portion and the first semi-circularly circumferential edge of the first engaging portion 110 is provided on the inner flange of the outer stator ring frame 11, and the second neck portion and the second semi-circularly circumferential edge of the second engaging portion 120 is provided on the outer flanges of the pole tooth units 12.

Referring again to FIGS. 1 and 2, the first engaging portion 110 is selected from a recession, while the second engaging portion 120 is selected from a protrusion. In an alternative embodiment, the first engaging portion 110 is selected from a protrusion, while the second engaging portion 120 is selected from a recession.

Turning now FIG. 5, the three-phase motor structure further includes a printed circuit board 2 including a plurality of contact points to correspondingly connect with the wire connection ends of the winding set 122. By way of example, the contact points include a first phase (U phase) contact point 21a, a second phase (V phase) contact point 21b and a third phase (W phase) contact point 21c. In assembling, the contact points are correspondingly connected with the wire connection ends of the winding set 122 by welding, for example.

Turning now FIG. 6, the three-phase motor structure further includes an inner rotor core 3 comprised of a rotor 31 and a magnet 32. In assembling, the inner rotor core 3 extends through the sectional stator 1, such that the inner pole faces of the pole tooth units 12 correspond to the magnet 32 for driving the motor.

Turning now FIG. 7, after assembling the sectional stator 1, the printed circuit board 2 is further attached to a side of the sectional stator 1 and electrically connects therewith. In order to improve the assembling operation, the contact points of U, V and W phases are provided with assembling marks shown at "U", "V" and "W" on the printed circuit board 2 for perfect alignment.

Figure 8:
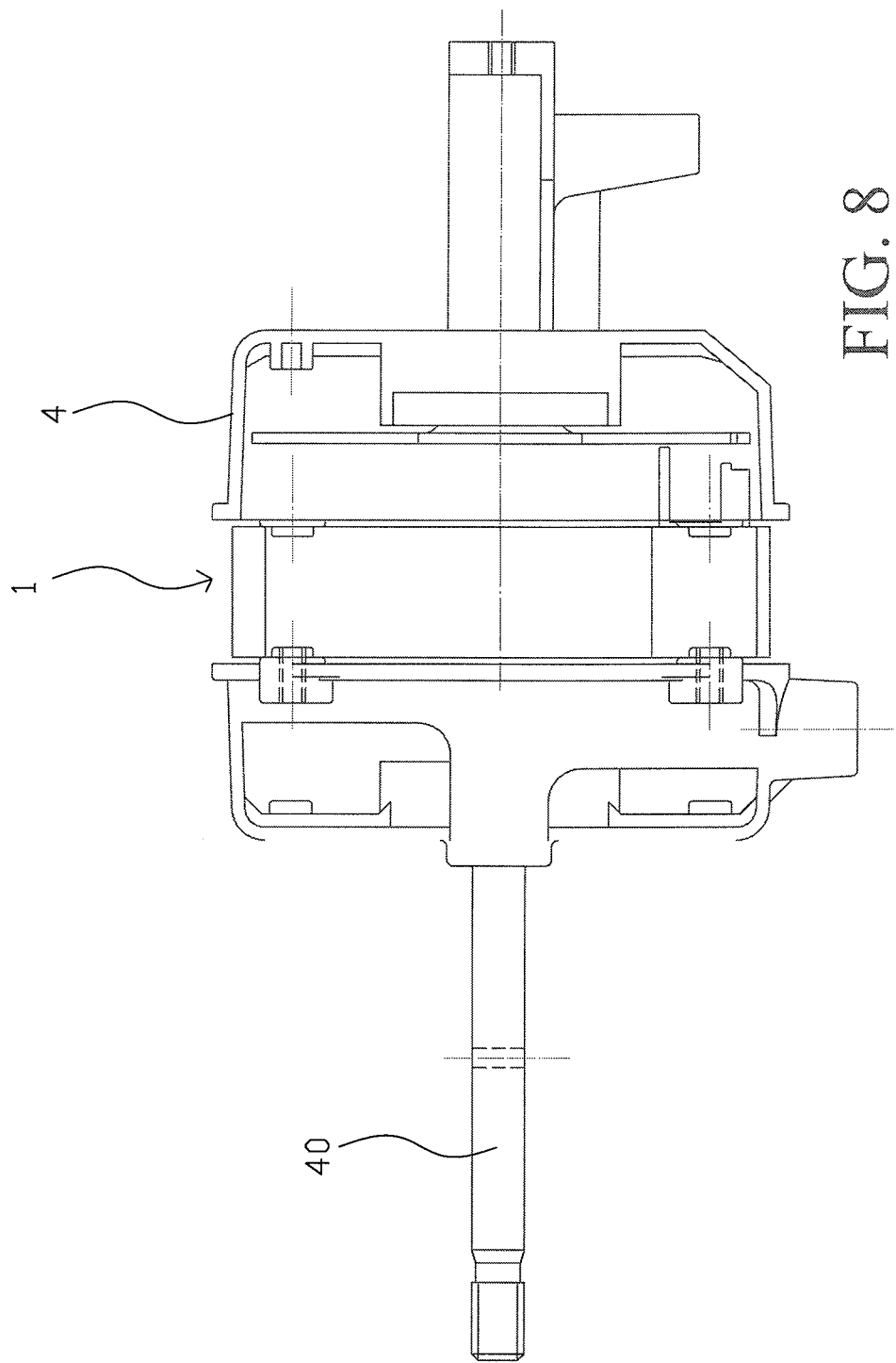
FIG. 8 is a sectional view of the three-phase motor structure of the present invention.

Turning now FIG. 8, the combined structure of the sectional stator 1, i.e. the printed circuit board 2 and the inner rotor core 3, is provided in a housing 4. When the sectional stator 1 is operated to drive the inner rotor core 3, an axis 40 combined with the inner rotor core 3 rotates synchronously. The housing 4 can be achieved in the known manner, so that the detailed descriptions may be omitted.

Although the invention has been described in detail with reference to its presently preferred embodiment(s), it will be understood by one of ordinary skill in the art that various modifications can be made without departing from the spirit and the scope of the invention, as set forth in the appended claims.

What is claimed is:

1. A manufacturing method of a three-phase motor structure consisting of:
   providing an inner flange of an outer stator ring frame with at least one first engaging portion;
   providing a series of detachable pole tooth units, with each of the detachable pole tooth units including at least one second engaging portion;

winding a plurality of wires on the series of detachable pole tooth units to provide a plurality of windings thereon;

assembling the series of detachable pole tooth units with the plurality of windings thereon with the outer stator ring frame to form a sectional stator by engaging the at least one second engaging portion with the at least one engaging portion for removable assembling;

attaching a printed circuit board to a predetermined position of a side of the sectional stator;

welding wire connection ends of the plurality of windings to contact points provided on the printed circuit board;

disconnecting the welded wire connection ends of the plurality of windings and the printed circuit board;

disassembling the series of detachable pole tooth units from the outer stator ring frame;

providing at least one detachable pole unit including the at least one second engaging portion;

assembling the outer stator ring frame and the at least one detachable pole tooth unit by engaging the at least one second engaging portion of the at least one detachable pole tooth unit with the at least one first engaging portion of the outer stator ring frame;

re-attaching the printed circuit board to the predetermined position of the side of the sectional stator; and welding the wire connection ends of the plurality of windings to the contact points provided on the printed circuit board.

2. The method as defined in claim 1, further comprising: providing magnetic conductive materials between the at least one first engaging portion of the outer stator ring frame and the at least one second engaging portion of the detachable pole tooth units.

3. The method as defined in claim 1, further comprising: forming a plurality of isolation devices on the plurality of windings of the series of detachable pole tooth units.

4. The method as defined in claim 1, further comprising: forming assembling marks of the contact points on the printed circuit board.

\* \* \* \* \*